United States Patent
Chin et al.

(10) Patent No.: US 8,885,614 B2
(45) Date of Patent: Nov. 11, 2014

(54) AVOIDANCE OF SYNCHRONIZATION OSCILLATION IN TD-SCDMA UPLINK SYNCHRONIZATION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/510,592

(22) PCT Filed: Mar. 24, 2010

(86) PCT No.: PCT/US2010/028539
§ 371 (c)(1),
(2), (4) Date: Jul. 27, 2012

(87) PCT Pub. No.: WO2011/075180
PCT Pub. Date: Jun. 23, 2011

(65) Prior Publication Data
US 2012/0281678 A1 Nov. 8, 2012

Related U.S. Application Data

(60) Provisional application No. 61/287,320, filed on Dec. 17, 2009.

(51) Int. Cl.
*H04B 7/216* (2006.01)
*H04W 56/00* (2009.01)
(52) U.S. Cl.
CPC ...... *H04W 56/0005* (2013.01); *H04W 56/0045* (2013.01)
USPC .......................................................... 370/335
(58) Field of Classification Search
None
See application file for complete search history.

(56) References Cited

U.S. PATENT DOCUMENTS

2001/0036168 A1* 11/2001 Terry ............................ 370/337
2002/0114356 A1* 8/2002 Morita et al. ................. 370/503

(Continued)

FOREIGN PATENT DOCUMENTS

| CN | 101438511 A | 5/2009 |
|---|---|---|
| EP | 1503523 | 2/2005 |
| EP | 1604495 B1 | 8/2006 |
| EP | 1871035 A1 | 12/2007 |

OTHER PUBLICATIONS

3GPP Group Radio Access Network: Physical channels and mapping of transport channelsonto physical channels (TDDXRelease 8) SRD Generation Partnership Project (3GPP); TechnicalSpecification (TS), XX, XX, vol. 25.221, No. V8.6.0, Sep. 1, 2009.

(Continued)

*Primary Examiner* — Otis L Thompson, Jr.
(74) *Attorney, Agent, or Firm* — Kristine U. Ekwueme

(57) ABSTRACT

Avoidance of uplink synchronization oscillation in TD-SCDMA systems begins when a user equipment receives a downlink SS command from a Node B. The user equipment obtains a previous uplink timing, which may be from a previous sub-frame associated with the downlink SS command. The user equipment would obtain this previous sub-frame associated with the SS command directly from the Node B as an identification of the Node B's sub-frame delay. The user equipment will then calculate the uplink timing for its next updated uplink signal by combining the previous uplink timing with the synchronization adjustment associated with the SS command. The user equipment then transmits its next uplink signal using the new uplink timing.

10 Claims, 10 Drawing Sheets

(56) References Cited

U.S. PATENT DOCUMENTS

| | | |
|---|---|---|
| 2002/0131379 A1* | 9/2002 | Lee et al. ............... 370/333 |
| 2004/0057529 A1* | 3/2004 | Koga et al. ............. 375/260 |
| 2004/0128095 A1* | 7/2004 | Oestreich ................. 702/89 |
| 2005/0182547 A1* | 8/2005 | Sah et al. ................ 701/67 |
| 2006/0166688 A1* | 7/2006 | Sun et al. ............... 455/502 |
| 2006/0245398 A1* | 11/2006 | Li et al. .................. 370/335 |
| 2006/0258383 A1* | 11/2006 | Jiang et al. ............. 455/502 |
| 2006/0280199 A1* | 12/2006 | Lane et al. .............. 370/458 |
| 2007/0054691 A1* | 3/2007 | Sankar et al. ........... 455/522 |
| 2007/0076809 A1* | 4/2007 | Koga et al. ............. 375/260 |
| 2007/0230394 A1* | 10/2007 | Wang et al. ............. 370/328 |
| 2008/0008209 A1* | 1/2008 | Morimoto ............... 370/458 |
| 2008/0170240 A1* | 7/2008 | Yamazoe ................. 356/620 |
| 2008/0232323 A1* | 9/2008 | Jeong et al. ............. 370/331 |
| 2009/0110101 A1* | 4/2009 | Koga et al. ............. 375/260 |
| 2010/0003983 A1* | 1/2010 | Gallagher et al. ....... 455/436 |
| 2010/0080181 A1* | 4/2010 | Yamada et al. .......... 370/329 |
| 2010/0280684 A1* | 11/2010 | Garon ..................... 701/21 |

OTHER PUBLICATIONS

International Search Report and Written Opinion—PCT/US2010/028539, ISA/EPO—Aug. 30, 2010.

3GPP Group Radio Access Network: "Requirement for support for radio resource management (TDD)", 3rd Generation Partnership Project (3GPP); 3GPP TS 25.123, V8.4.0 (Release 8), Sep. 30, 2009, pp. 1-19.

Taiwan Search Report—TW099112945—TIPO—Nov. 28, 2013.

* cited by examiner

| Slot Format # | Spreading Factor | Midamble length (chips) | $N_{TFCI}$ code word (bits) | $N_{SS}$ & $N_{TPC}$ (bits) | Bits/slot | $N_{data}$/Slot (bits) | $N_{data}$/data field(1) (bits) | $N_{data}$/data field(2) (bits) |
|---|---|---|---|---|---|---|---|---|
| 0 | 16 | 144 | 0  | 0 & 0 | 88 | 88 | 44 | 44 |
| 1 | 16 | 144 | 4  | 0 & 0 | 88 | 86 | 42 | 44 |
| 2 | 16 | 144 | 8  | 0 & 0 | 88 | 84 | 42 | 42 |
| 3 | 16 | 144 | 16 | 0 & 0 | 88 | 80 | 40 | 40 |
| 4 | 16 | 144 | 32 | 0 & 0 | 88 | 72 | 36 | 36 |
| 5 | 16 | 144 | 0  | 2 & 2 | 88 | 84 | 44 | 40 |
| 6 | 16 | 144 | 4  | 2 & 2 | 88 | 82 | 42 | 40 |
| 7 | 16 | 144 | 8  | 2 & 2 | 88 | 80 | 42 | 38 |
| 8 | 16 | 144 | 16 | 2 & 2 | 88 | 76 | 40 | 36 |
| 9 | 16 | 144 | 32 | 2 & 2 | 88 | 68 | 36 | 32 |

FIG. 4

AVOIDANCE OF SYNCHRONIZATION OSCILLATION IN TD-SCDMA UPLINK SYNCHRONIZATION

CROSS-REFERENCE TO RELATED APPLICATION(S)

This application claims the benefit of U.S. Provisional Patent Application No. 61/287,320, entitled "AVOIDANCE OF SYNCHRONIZATION OSCILLATION IN TD-SCDMA UPLINK SYNCHRONIZATION," and filed on Dec. 17, 2009, which is expressly incorporated by reference herein in its entirety.

BACKGROUND

1. Field

The present teachings relate, in general, to time division-synchronous code division multiple access (TD-SCDMA) operation, and, more particularly, to avoiding oscillation in TD-SCDMA uplink synchronization.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Aspects of the present teachings are directed to avoidance of uplink synchronization oscillation in TD-SCDMA systems. A user equipment receives a downlink synchronization shift (SS) command from a Node B. The user equipment obtains a previous uplink timing, which may be from a previous sub-frame associated with the downlink SS command. The user equipment would obtain this previous sub-frame associated with the SS command directly from the Node B as an identification of the Node B's sub-frame delay. The user equipment will then calculate the uplink timing for its next updated uplink signal by combining the previous uplink timing with the synchronization adjustment associated with the SS command. The user equipment then transmits its next uplink signal using the new uplink timing.

Further representative aspects of the present disclosure are directed to methods for synchronizing uplink timing in user equipment. The methods include receiving a downlink synchronization shift command in a current sub-frame, obtaining a preceding uplink timing from a preceding sub-frame, adjusting a next uplink timing based on the preceding uplink timing and the downlink SS command of the current sub-frame, and transmitting a next sub-frame using the next uplink timing.

Additional representative aspects of the present disclosure are directed to methods for synchronizing uplink timing in user equipment. These methods include determining a sub-frame delay based on a delay between receipt of an uplink signal from the user equipment and transmission of a SS command to the user equipment and transmitting the sub-frame delay to the user equipment for uplink synchronization.

Still further representative aspects of the present disclosure are directed to user equipment of a TD-SCDMA system. The user equipment includes at least one processor configured to receive a downlink SS command in a current sub-frame, to obtain a preceding uplink timing from a preceding sub-frame, to adjust a next uplink timing based on the preceding uplink timing and the downlink SS command of the current sub-frame, and to transmit a next sub-frame using the next uplink timing. The user equipment further includes a memory coupled to said processor.

Still further representative aspects of the present disclosure are directed to Node Bs of a TD-SCDMA system. The Node Bs include at least one processor configured to determine a sub-frame delay based on a delay between receipt of an uplink signal from a user equipment and transmission of a SS command to the user equipment, and to transmit the sub-frame delay to the user equipment for uplink synchronization. The Node Bs further include a memory coupled to said at least one processor.

Still further representative aspects of the present disclosure are directed to computer readable media that include program code tangibly stored thereon. The code includes code to receive a downlink SS command at a user equipment in a current sub-frame, code to obtain a preceding uplink timing from a preceding sub-frame, code to adjust a next uplink timing based on the preceding uplink timing and the downlink SS command of the current sub-frame, and code to transmit a next sub-frame using the next uplink timing.

Still further representative aspects of the present disclosure are directed to computer readable media including program code tangibly stored thereon. Such program code includes code to determine a sub-frame delay based on a delay between receipt of an uplink signal from a user equipment and transmission of a SS command to the user equipment and code to transmit the sub-frame delay to the user equipment for uplink synchronization.

Still further representative aspects of the present disclosure are directed to apparatuses for synchronizing uplink timing in user equipment. The system includes means for receiving a downlink SS command in a current sub-frame, means for obtaining a preceding uplink timing from a preceding sub-frame, means for adjusting a next uplink timing based on the preceding uplink timing and the downlink SS command of the current sub-frame, and means for transmitting a next sub-frame using the next uplink timing.

Still further representative aspects of the present disclosure are directed to apparatuses for synchronizing uplink timing in user equipment. The systems including means for determining a sub-frame delay based on a delay between receipt of an uplink signal from the user equipment and transmission of a SS command to the user equipment, and means for transmitting the sub-frame delay to the user equipment for uplink synchronization.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific aspects disclosed may be readily utilized as a basis for modifying or designing other structures for carrying out the same purposes of the present teachings. It should also be realized by those skilled in the art that such equivalent constructions do not depart from the technology of the teachings as set forth in the appended claims. The novel features which are believed to be characteristic of the teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following description taken in conjunction with the accompanying drawings.

FIG. 4 illustrates an example of bit allocation for both downlink and uplink TD-SCDMA transmissions.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
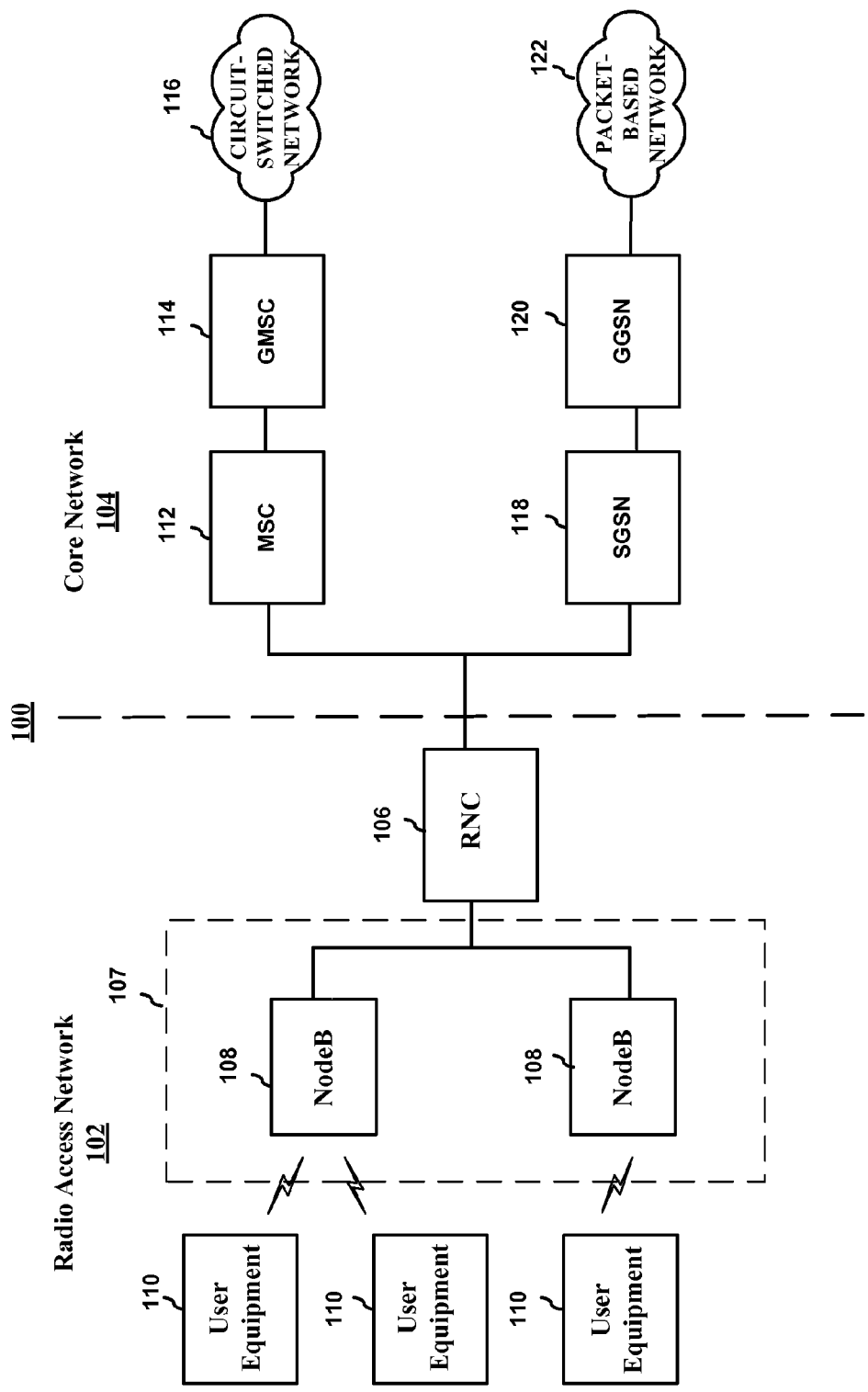
FIG. 1 is a block diagram illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
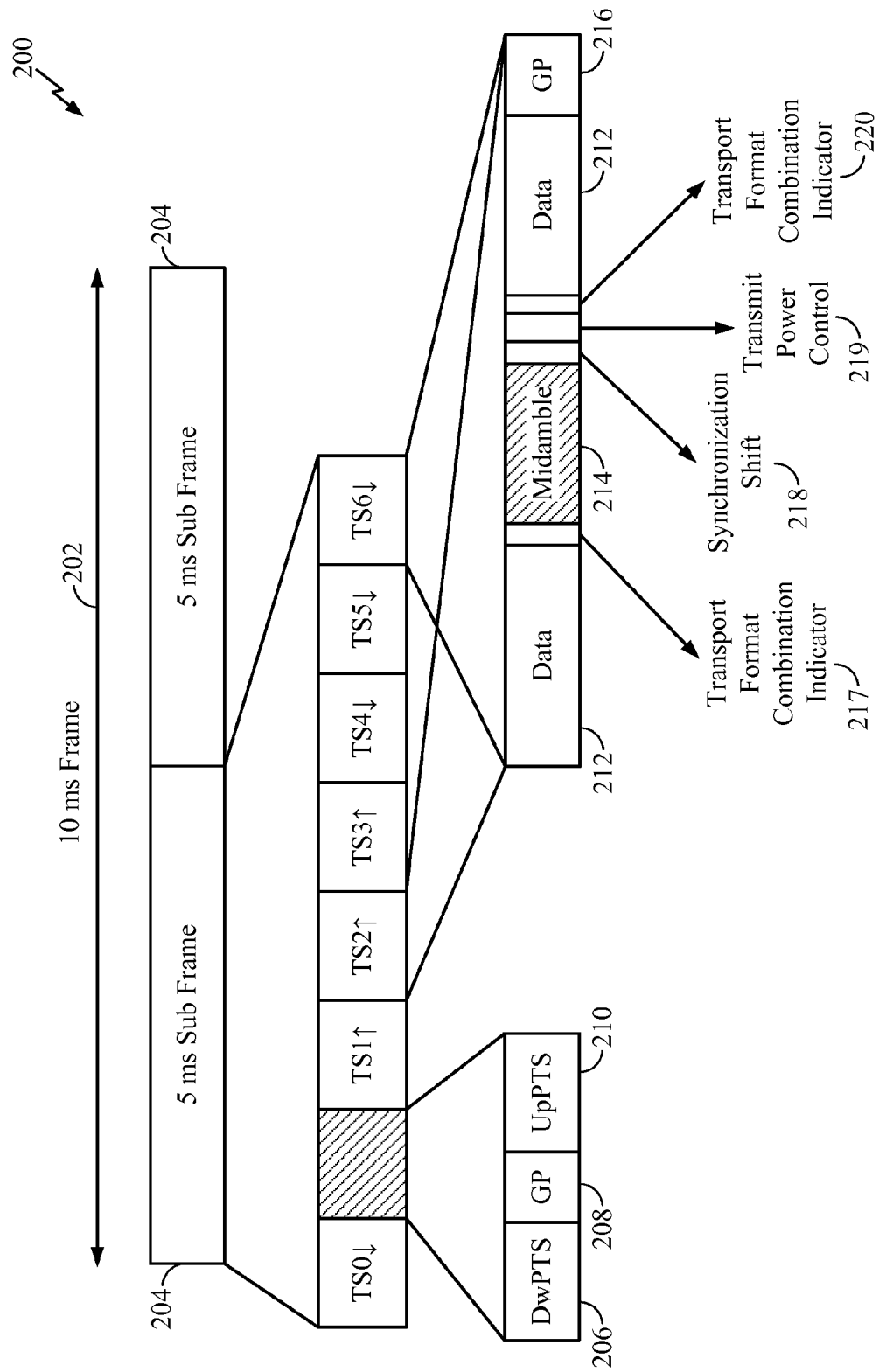
FIG. 2 shows a frame structure for a TD-SCDMA carrier.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

The data portion 212 may comprise Layer 1 control information, including a Synchronization Shift (SS) field 218, a Transmit Power Control (TPC) field 219, and Transport Format Combination Indicator (TFCI) fields 217 and 220. The SS field 218 and the TPC field 219 may only appear in the second data portion 212. One of the TFCI fields 217-220 may also precede the mid-amble 214. The TFCI fields 217 and 220 may indicate the format of a Coded Composite Transport Channel (CCTrCH). The TPC field 219 may indicate up or down transmit power command to a receiving node. The SS command bits 218 immediately following the mid-amble 214 may indicate three possible cases: delayed, advanced, or "do nothing" in the uplink transmission timing.

Figure 3:
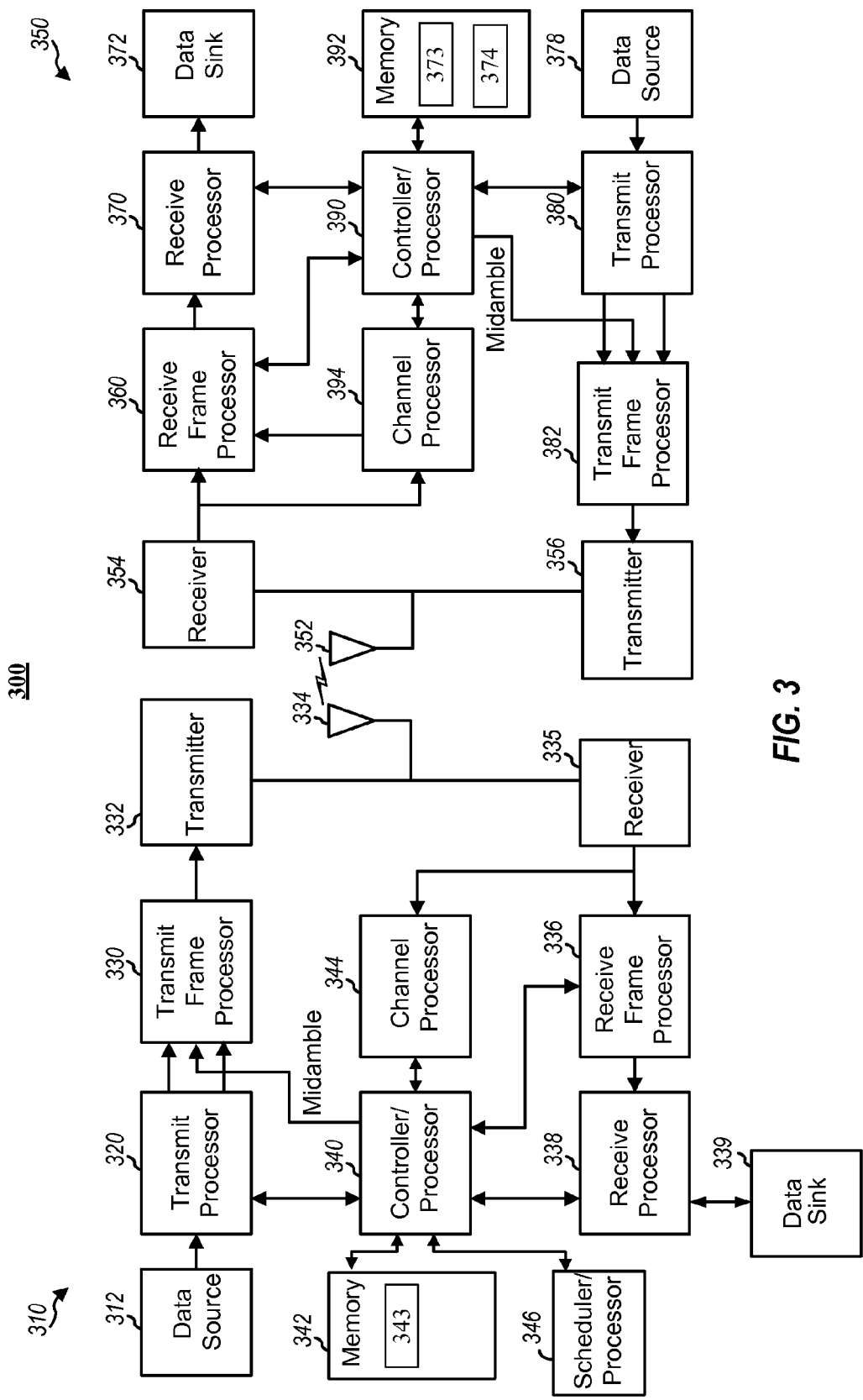
FIG. 3 is a block diagram of a Node B in communication with a piece of user equipment in a radio access network.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and de-spreads the symbols, and then determines the most likely signal constellation points transmitted by the Node B 310 based on the modulation scheme. These soft decisions may be based on channel estimates computed by the channel processor 394. The soft decisions are then decoded and de-interleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

FIG. 4 is a table 40 illustrating an example of bit allocation for both downlink and uplink TD-SCDMA transmissions, particularly for the voice service in which the spreading factor (SF) of 16 may be applied. It can be observed that the SS bits may be allocated in both uplink and downlink time slots. However, user equipment may not need to transmit the SS command bits to the Node B because downlink transmission is always synchronous to the Node B timing. The SS command bits are present in the uplink transmission purely to provide the same format for downlink and uplink transmissions.

Figure 5:
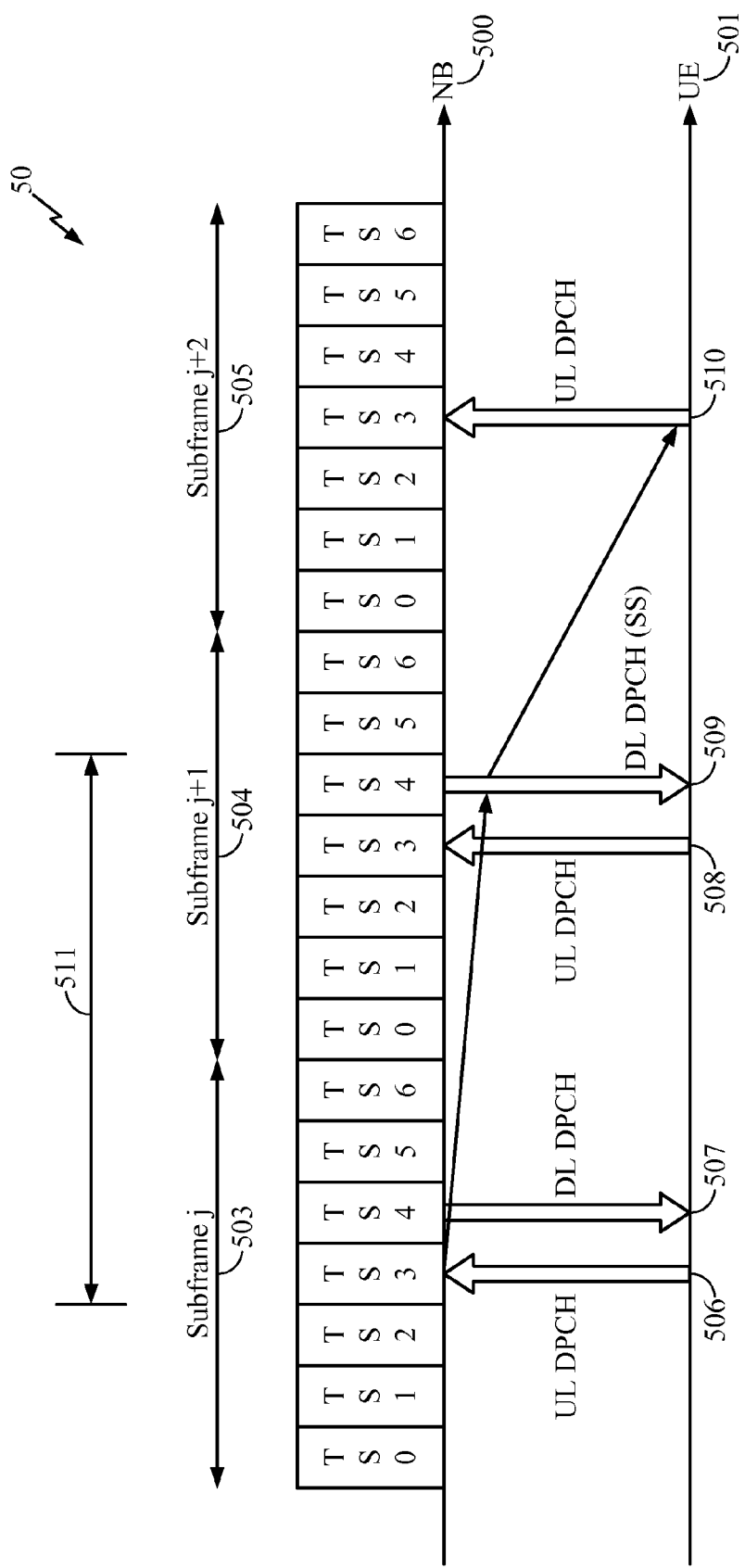
FIG. 5 is a diagram illustrating a communication stream between a Node B and a piece of user equipment.

FIG. 5 is a diagram illustrating a communication stream 50 between a Node B 500 and a user equipment 501. The communication stream 50 shows three sub-frames of communication with the Node B 500, sub-frame j 503, sub-frame j+1 504, and sub-frame j+2 505. While the communication stream 50 may continue with additional sub-frames, only the three illustrated sub-frames are shown for purposes of convenience and clarity. The Node B 500 may service multiple different UEs within its service cell. Again, for purposes of clarity, only the user equipment 501 is illustrated in FIG. 5. However, the operation between the Node B 500 and other UEs will be similar to that described with respect to the user equipment 501. Within the communication network, the Node B 500 assigns the user equipment 501 a dedicated physical channel (DPCH) for uplink communication in the timeslot, TS3. It also schedules its downlink communications to the user equipment 501 for TS4 in the sub-channel j 503. Thus, in sub-frame j 503, the user equipment 501 transmits its uplink signal on uplink DPCH 506 at TS3 and receives a downlink signal from the Node B 500 in TS4 at downlink DPCH 507. The uplink signal from the user equipment 501 should be received by the Node B 500 at the same time as the other uplink signals of UEs assigned to TS3. This is the synchronous nature of TD-SCDMA.

To maintain synchronization of the user equipment 501 communications, the Node B 500 measures the timing of the uplink signal received on uplink DPCH 506. Based on this timing measurement, the Node B 500 will determine whether or not the uplink signal from the user equipment 501 was early, late, or on time. Depending on this determination, the Node B 500 will generate its SS command for modifying the transmission timing of the user equipment 501. If the uplink transmission is determined to be early, the Node B 500 generates an SS command that instructs the user equipment 501 to delay its transmission time. Conversely, if the uplink transmission is determined to be late, the Node B 500 generates an SS command that instructs the user equipment 501 to move its transmission time earlier. Otherwise, if the uplink transmission is determined to be on time, then the Node B 500 generates an SS command that instructs the user equipment 501 to do nothing.

After the Node B 500 has received the uplink signal on uplink DPCH 506, measured the timing of the uplink command, and then generated the appropriate associated SS command, it will transmit that SS command to the user equipment 501 in a subsequent downlink signal. As illustrated in FIG. 5, the Node B 500 transmits the SS command related to the measurement of the uplink signal at uplink DPCH 506 during its downlink signal at downlink DPCH 509 of TS4 in the sub-frame j+1 504. This downlink signal to the user equipment 501 is the next available downlink timeslot scheduled for the user equipment 501 and occurs after the next uplink signal has been transmitted from the user equipment 501 and received by the Node B 500 at uplink DPCH 508 of TS3 in the sub-frame j+1 504. Thereafter, the user equipment 501 will read the SS command and make the associated transmission timing adjustments. Those adjustments will be implemented in its next uplink signal transmitted at uplink DPCH 510 of TS3 in the sub-frame j+2 505.

Because of the signal transmission time between the user equipment 501 and the Node B 500 as well as the time that the Node B 500 uses to measure and process the uplink signals and generate the SS command, there is a certain delay between receiving the uplink signal and transmitting the associated SS command back to the user equipment 501. This transmission and processing delay is referred to herein as the "sub-frame delay." As illustrated in FIG. 5, a sub-frame delay 511 is defined as the delay between receipt of the uplink signal at uplink DPCH 506 and transmission of the associated SS command at downlink DPCH 509. The inherent time for transmission coupled with the inherent time to process the SS command makes it improbable that the Node B 500 would be capable of transmitting an associated SS command as quickly as in downlink DPCH 507. With each sub-frame often being approximately 5 ms, and each timeslot within the sub-frame often being only approximately 864 chips, there would not be much time for transmission to the Node B 500, processing at the Node B 500, and then transmission back to the user equipment 501.

At the user equipment 501, when it receives an SS command instructing a change in transmission timing, the user equipment 501 adjusts the timing according to a pre-defined timing adjustment step. In certain aspects of the present teachings, the timing adjustment step is calculated according to the formula:

$$\text{Timing adjustment step} = k/8 \text{ chips} \quad (1)$$

where k is an integer value between 1 and 8 representing the uplink synchronization step size determined by the wireless network. This uplink synchronization step size, k, may be configured in various radio resource control (RRC) messages, such as the physical channel reconfiguration message, the radio bearer reconfiguration message, the RRC connection setup, or the like.

The user equipment 501 will, therefore, make timing adjustments in an amount equal to the timing adjustment step in which the direction of the timing adjustment is controlled by the specific SS command received from the Node B 500. However, the user equipment 501 may not simply update and adjust its transmission timing every sub-frame. In certain aspects of the present teachings, the timing adjustment may take place in the sub-frame satisfying the formula:

$$\text{SFN}' \text{ modulo } M=0 \quad (2)$$

where SFN' represents the system sub-frame number and M is defined as the uplink synchronization frequency, which may be anywhere between 1 and 8 sub-frames. The uplink synchronization frequency, M, is predetermined by the wireless network and may be configured in various RRC messages, such as the physical channel reconfiguration message, the radio bearer reconfiguration message, the RRC connection setup, or the like.

Figure 6:
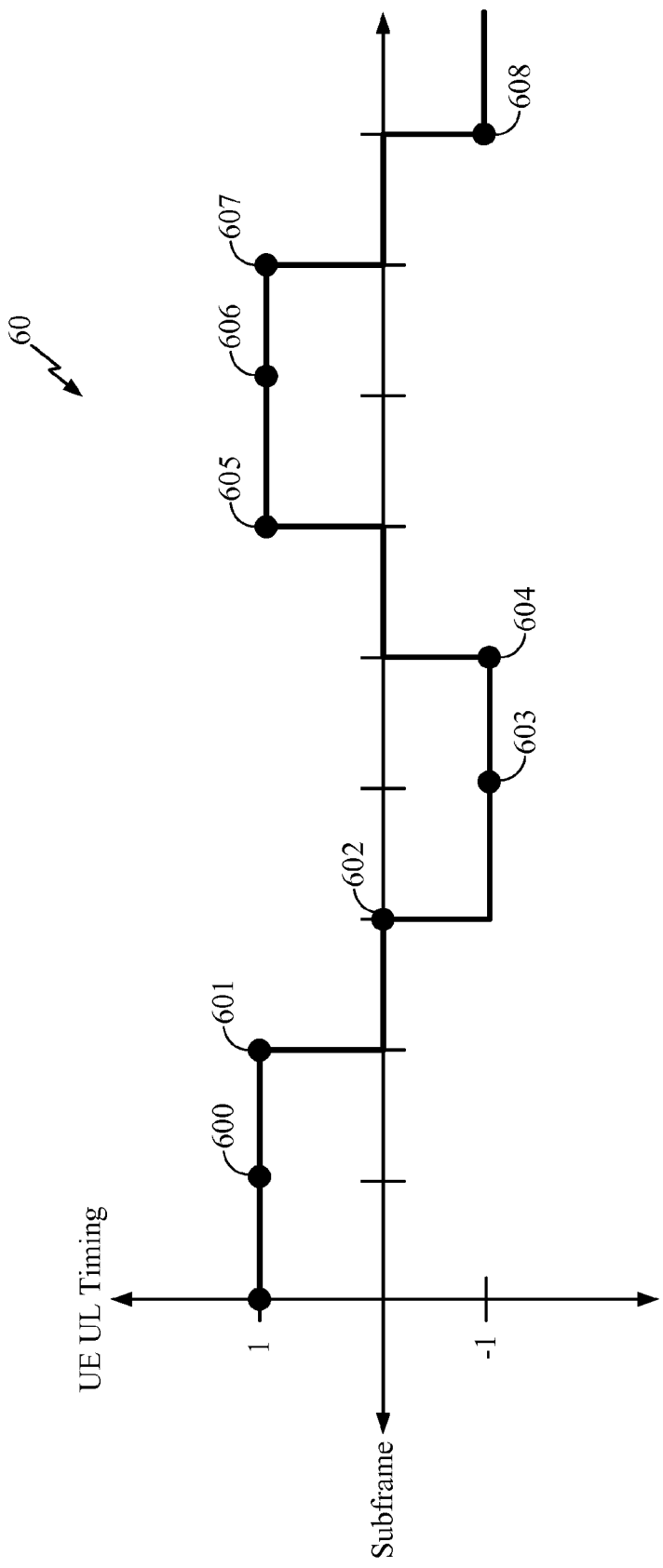
FIG. 6 is a chart illustrating user equipment uplink timing over a series of sub-frames.

Under the current standards of TD-SCDMA networks, the sub-frame delay coupled with a lower uplink synchronization frequency, M, may cause an oscillation in the uplink synchronization. FIG. 6 is a chart illustrating user equipment uplink timing 60 over a series of sub-frames. At sub-frame 600, the user equipment uplink timing measures at a timing delay of 1 unit late. At this point, there are no adjustments to be made by the user equipment because no SS command has been transmitted. The Node B measures the uplink signal and determines the associated SS command and transmits that command in sub-frame 601. However, at sub-frame 601, the user equipment has yet to receive the SS command, and, therefore, still has no timing adjustments to make and still measures at a timing delay of 1 unit late. At sub-frame 602, the user equipment makes an adjustment of 1 timing adjustment step earlier, which causes the uplink signal to measure on time. However, based on the time delay of the user equipment uplink signal from the previous sub-frame 601, which was still 1 unit late, the Node B has measured the uplink signal from sub-frame 601, generated an SS command associated with the uplink timing being 1 unit late, and transmitted that command to the user equipment during the current sub-frame 602, when the uplink signal is already measuring on time. This causes the user equipment to again make another adjustment of 1 timing adjustment step earlier in sub-frame 603, which causes the timing of the user equipment uplink to become a timing delay of 1 unit early. There is no adjustment to be made in sub-frame 603 because, when measuring the timing delay of the uplink signal from sub-frame 602, which was on time, the Node B generated an SS command to do nothing. However, as the uplink signal now measures 1 unit early, the Node B measures the early timing and generates the associated SS command to delay the transmission of the user equipment uplink. This process continues through sub-frames 604-608 in which the user equipment uplink timing will keep oscillating between being late, on time, and then early without converging to a continuous on time timing. This oscillation is caused by the sub-frame delay between the sub-frame in which the Node B receives the uplink signal and the sub-frame in which the Node B can transmit the associated SS command and the uplink synchronization frequency. Oscillation in the synchronization of user equipment uplink signals can create intra-cell interference, thus, reducing Node B's uplink capacity. If the update synchronization frequency is long enough to account for the sub-frame delay, the uplink timing will eventually converge to an on time signal. However, maintaining the synchronization of the user equipment uplink signals is important to maintaining the uplink capacity and capabilities of the TD-SCDMA system. Therefore, a longer update synchronization frequency is not particularly desirable.

Figure 7:
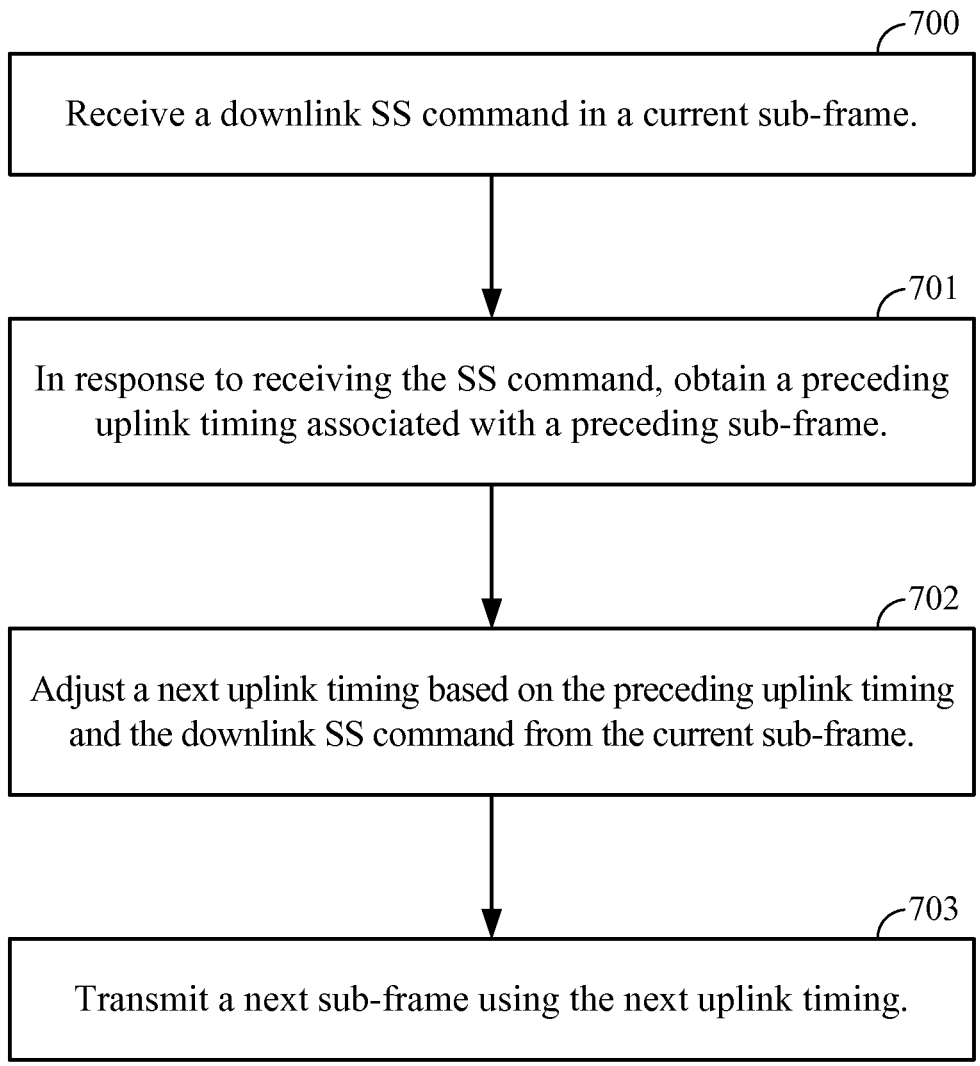
FIG. 7 is a functional block diagram illustrating functional blocks executed according to one aspect of the present teachings.

Turning now to FIG. 7, a functional block diagram is shown illustrating functional blocks executed according to one aspect of the present teachings. In block 700, a downlink SS command is received by a user equipment in a current sub-frame. In response to receiving the SS command, in block 701, the user equipment obtains a preceding uplink timing associated with a preceding sub-frame. The user equipment then adjusts, in block 702, a next uplink timing based on the preceding uplink timing and the downlink SS command from the current sub-frame. In block 703, the user equipment transmits a next sub-frame using the next uplink timing. Accordingly, the next uplink timing used by the user equipment is based on a previous uplink timing from a sub-frame which is at least two sub-frames prior to the next sub-frame.

In reference to the functional blocks illustrated in FIG. 7, the UEs in such aspects of the present teaching provide for a data structure or table in a memory that will store the uplink timing measurements for preceding sub-frames. In certain aspects of the present teachings, the preceding uplink timing measurements may be stored up to a certain number of past sub-frames. Thus, the user equipment would have a dynamic window of uplink timing values for a certain number of sub-frames before the current sub-frame. In such aspects, the particular preceding sub-frame, from which the uplink timing is obtained, may be any number of previous sub-frames from the immediately preceding sub-frame or multiple sub-frames in the past. The various aspects of the present teachings are not limited to a specific parameter of preceding sub-frames from which to obtain the preceding uplink timing.

It should be noted that in various aspects of the present teachings, the user equipment may include oscillation detection logic for triggering execution of the functional blocks of FIG. 7. Executing such logic, the user equipment would detect when a synchronization oscillation occurs and begin making uplink timing adjustments based on preceding uplink timing measurements that are at least two sub-frames before the sub-frame during which the user equipment will transmit the adjusted uplink signal. In still other aspects of the present teachings, the user equipment may continually execute the functional blocks of FIG. 7 in making its uplink timing adjustments.

Figure 8:
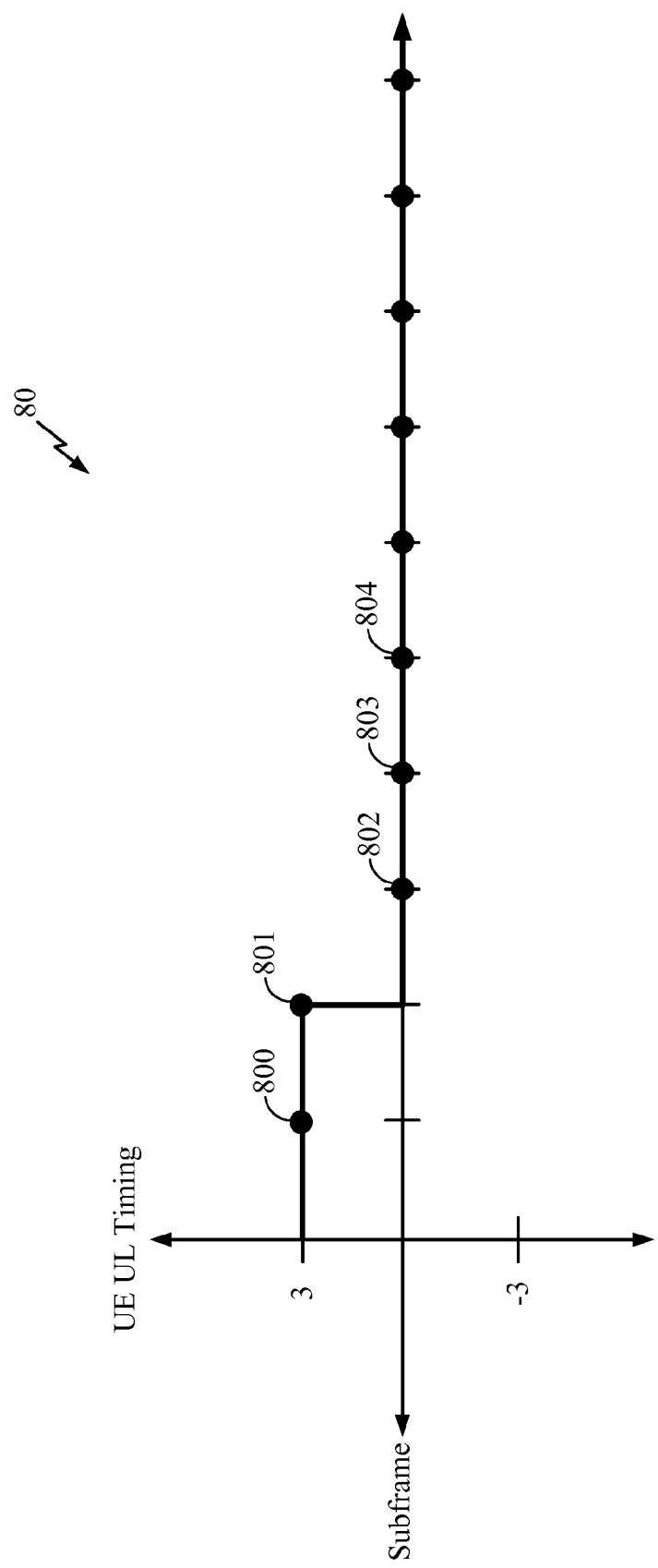
FIG. 8 is a chart illustrating user equipment uplink timing over a series of sub-frames in a wireless network configured according to one aspect of the present teachings.

FIG. 8 is a chart illustrating user equipment uplink timing 80 over a series of sub-frames in a wireless network configured according to one aspect of the present teachings. At sub-frame 800, the uplink timing from the user equipment measures a timing delay of 3 units late. At this point in the communication, there are no adjustments for the user equipment to make, as the Node B has not transmitted an SS command. Such instance may occur when the user equipment first enters a cell sector covered by the Node B. Measuring the uplink signal to be 3 units late, the Node B generates an associated SS command. The user equipment again transmits its uplink signal at the next sub-frame 801 measured at a timing delay of 3 units late. On receiving the downlink signal from the Node B in sub-frame 801, the user equipment extracts the SS command and processes its uplink synchronization timing. Instead of starting with the user equipment's current uplink timing last used to transmit its uplink signal in sub-frame 801, the user equipment obtains its uplink timing from sub-frame 800 and applies the timing adjustment to that preceding uplink timing. For the aspect of the present teachings illustrated in FIG. 8, the timing adjustment step is equal to 3 units, even though other aspects may provide for different timing adjustment steps. Thus, while preparing to transmit its uplink signal for sub-frame 802, the user equipment obtains the uplink timing it used in sub-frame 800 and combines it with the timing adjustment step associated with the received SS command in sub-frame 801. In the presently described aspect, the user equipment subtracts the timing adjustment step from the uplink timing from sub-frame 800 and transmits its uplink signal in sub-frame 802 using the resulting new uplink timing.

The uplink timing of sub-frame 802 measures to be on time. However, the next SS command received from the Node B in sub-frame 802 is based on the measurement of the user equipment uplink timing in sub-frame 801, which still measured at a timing delay of 3 units. Therefore, the next SS command received from the Node B in sub-frame 802 still indicates for the user equipment to adjust its uplink timing earlier. As the user equipment receives the downlink signal from the Node B in sub-frame 802, it extracts the SS command and, again, determines its next uplink timing for sub-frame 803. Following the same procedure, the user equipment obtains the uplink timing setting from the previous sub-frame, i.e., sub-frame 801. Because the uplink timing from sub-frame 801 still measured a 3 unit timing delay, the corresponding timing adjustment step that the user equipment will apply to the next uplink timing will, again, result in an on time uplink signal for sub-frame 803. Therefore, the user equipment will transmit its uplink signal at sub-frame 803 such that the Node B will again measure it to be on time. The SS command that the user equipment receives in the downlink signal in sub-frame 803 is based on the uplink timing received and measured from sub-frame 802, which was on time. Therefore, the SS command transmitted to the user equipment will instruct the user equipment to do nothing. If no additional delays are introduced to the uplink signal timing from an external source, the continuation of sub-frame communication should result in continued on time uplink signals at sub-frame 804 which result in SS commands from the Node B for the user equipment to do nothing to modify the uplink timing.

As noted with regard to FIG. 5, there may be a sub-frame delay 511 between the sub-frame during which the Node B receives the uplink signal from the particular user equipment and the subsequent sub-frame during which the Node B is able to transmit the SS command associated with that uplink signal to the user equipment. If this delay is more than one sub-frame, it is beneficial for the user equipment to know the sub-frame delay, such that, if the received SS command in a current frame is associated with the measurement of the user equipment's uplink signals transmitted two or more frames previous, then the method of calculating the uplink timing adjustment should reflect that association by pointing the user equipment back to the sub-frame of the associated uplink signal for calculation purposes.

Figure 9:
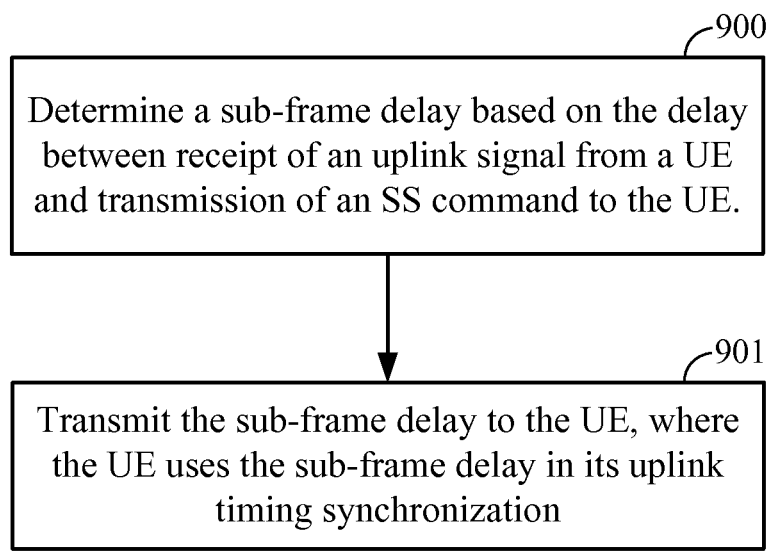
FIG. 9 is a functional block diagram illustrating example functional blocks executed in one aspect of the present teachings.

FIG. 9 is a functional block diagram illustrating example functional blocks executed in one aspect of the present teachings. In block 900, a sub-frame delay is determined based on the delay between receipt of an uplink signal from a user equipment and transmission of an SS command to the user equipment. During this sub-frame delay, the Node B measures the timing of the uplink signal and generates the associated SS command for the resulting timing measurement. In block 901, the Node B transmits the sub-frame delay to the user equipment, where the user equipment uses the sub-frame delay in its uplink timing synchronization.

Figure 10:
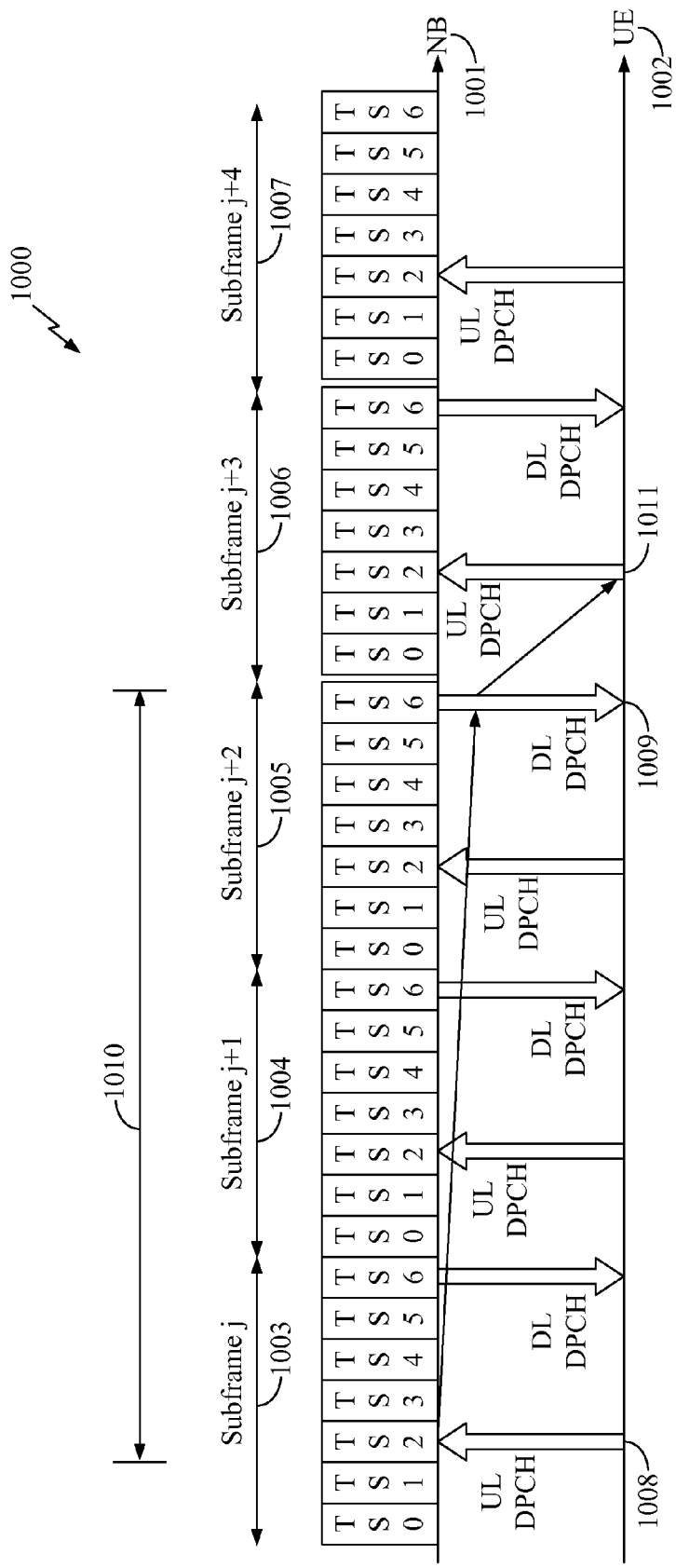
FIG. 10 is a diagram illustrating a communication stream between a Node B and a user equipment in a wireless network configured according to one aspect of the present teachings.

FIG. 10 is a diagram illustrating a communication stream 1000 between a Node B 1001 and a user equipment 1002 in a wireless network configured according to one aspect of the present teachings. The communication stream 1000 comprises various numbers of sub-streams of communication involving the Node B 1001 and various numbers of different UEs. However, for the sake of clarity, the aspect depicted in FIG. 10 illustrates five sub-frames, 1003-1007, and the communication activity with only a single user equipment device, the user equipment 1002. The Node B 1001 knows that it has a sub-frame delay of two sub-frames, the sub-frame delay 1010. Thus, it takes the Node B 1001 two sub-frames from the time it receives the uplink signal from the user equipment 1002 at the uplink DPCH 1008 in TS2 of the sub-frame j 1003 and the time it transmits the SS command in its downlink signal at the downlink DPCH 1009 in TS6 of the sub-frame j+2 1005. The Node B 1001 communicates the sub-frame delay 1010 to the user equipment 1002 using a radio resource control (RRC) message, such as the radio bearer setup message, the radio bearer reconfiguration message, the physical channel reconfiguration message, or the like. In preparation for its uplink transmission in sub-frame j+3 1006 at uplink DPCH 1011, the user equipment 1002 determines the uplink timing for sub-frame j+3 1006 by obtaining the uplink timing from the second preceding sub-frame, i.e., sub-frame j 1003, from the current sub-frame j+2 1005, and modifying that uplink timing using the uplink synchronization step associated with the SS command received from the Node B 1001 in downlink DPCH 1009. This process maintains a correlation between the adjustment made by the user equipment and the uplink timing measurement that prompted the Node B 1001 to generate and transmit the particular SS command.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, such as those described with respect to FIGS. 7 and 9, may be embodied directly in hardware, in a software module executed by a processor, or in a combination of the two. A software module may reside in any form of storage medium that is known in the art. For example, the memory 392 of the UE 350 stores uplink timing table 373 and timing adjustment module 374. When executed by the controller/processor 390, the program code of the timing adjustment module 374 configures the UE 350 to perform the functions described in FIG. 7, along with the other functionalities described herein for mobile devices or other UEs. Moreover, the UE 350 may store a record of its preceding uplink timing for preceding sub-frames in uplink timing table 373. Additionally, the memory 342 of the base station 310 stores sub-frame delay module 343. When executed by the controller/processor 340, the program code of the sub-frame delay module 343 configures the base station 310 to perform the functions described FIG. 9, along with the other functionalities described herein for base stations or Node Bs. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Turning back to FIG. 3, in one configuration, the UE 350 includes means for receiving a downlink SS command in a current sub-frame. In one aspect, the aforementioned means may be the smart antennas 352, the receiver 354, the receive frame processor 360, and the receive processor 370. The UE 350 of this configuration also includes means for obtaining a preceding uplink timing from a preceding sub-frame. In one aspect, the aforementioned means may be the memory 392 storing the uplink timing table 373, along with the controller/processor 390 for controlling access to the preceding uplink timing from the uplink timing table 373. The UE 350 of this configuration also includes means for adjusting a next uplink timing based on the preceding uplink timing and the downlink SS command of the current sub-frame. In one aspect, the aforementioned means may be the timing adjustment module 374 stored on the memory 392 and executed by the controller/processor 390. As illustrated in the example described with respect to FIG. 8, the UE 350, under control of the operating timing adjustment module 374, uses the downlink SS command to adjust the preceding uplink timing in order to calculate the next uplink timing. The UE of this configuration also includes means for transmitting a next sub-frame using the next uplink timing. In one aspect, the aforementioned means may be the controller/processor 390, the transmit processor 380, and transmit frame processor 382, the transmitter 356, and the smart antennas 352.

In one configuration, the Node B 310 includes means for determining a sub-frame delay based on a delay between receipt of an uplink signal from a UE and transmission of an SS command to the UE. In one aspect, the aforementioned means may be the sub-frame delay module 343 stored on the memory 342 and executed by the controller/processor 340. As illustrated in the example described with respect to FIG. 9, the Node B 310 determines the sub-frame delay by calculating the time between the receipt of an uplink signal from an UE and the time the Node B 310 transmits the downlink SS command resulting from the measurements of the received uplink signal. The Node B of this configuration also includes means for transmitting the sub-frame delay to the UE for uplink synchronization. In one aspect, the aforementioned means may be the controller/processor 340, the transmit processor 320, the transmit frame processor 330, the transmitter 332, and the smart antennas 334.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method for synchronizing uplink timing in a user equipment (UE), said method comprising:
   receiving a downlink synchronization shift (SS) command in a current sub-frame;
   obtaining a preceding uplink timing from a preceding sub-frame associated with the downlink SS command;
   adjusting a next uplink timing based on said preceding uplink timing and said downlink SS command of said current sub-frame; and
   transmitting a next sub-frame using said next uplink timing.

2. The method of claim 1 wherein said preceding sub-frame comprises one of:
   an adjacent preceding sub-frame; and
   a non-adjacent preceding sub-frame defined based on a sub-frame delay of a Node B in communication with said UE.

3. The method of claim 1 further comprising:
   detecting an oscillation in uplink timing synchronization, wherein said obtaining and said adjusting are performed in response to said oscillation.

4. An apparatus of a time division-synchronous code division multiple access (TD-SCDMA) system, said apparatus comprising:
   at least one processor configured:
      to receive a downlink synchronization shift (SS) command in a current sub-frame;
      to obtain a preceding uplink timing from a preceding sub-frame associated with the downlink SS command;
      to adjust a next uplink timing based on said preceding uplink timing and said downlink SS command of said current sub-frame; and
      to transmit a next sub-frame using said next uplink timing; and
   a memory coupled to said processor.

5. The apparatus of claim 4 wherein said preceding sub-frame comprises one of:
   an adjacent preceding sub-frame; and
   a non-adjacent preceding sub-frame defined based on a sub-frame delay of a Node B in communication with said apparatus.

6. The apparatus of claim 4 said at least one processor is further configured:
   to detect an oscillation in uplink timing synchronization, wherein said obtaining and said adjusting are performed in response to said oscillation.

7. A non-transitory computer readable medium including program code tangibly stored thereon, comprising:
   program code to receive a downlink synchronization shift (SS) command at a user equipment (UE) in a current sub-frame;
   program code to obtain a preceding uplink timing from a preceding sub-frame associated with the downlink SS command;
   program code to adjust a next uplink timing based on said preceding uplink timing and said downlink SS command of said current sub-frame; and
   program code to transmit a next sub-frame using said next uplink timing.

8. The computer readable medium of claim 7 wherein said preceding sub-frame comprises one of:
   an adjacent preceding sub-frame; and
   a non-adjacent preceding sub-frame defined based on a sub-frame delay of a Node B in communication with said UE.

9. The computer readable medium of claim 7 further comprising:
   program code to detect an oscillation in uplink timing synchronization, wherein said obtaining and said adjusting are performed in response to said oscillation.

10. An apparatus for synchronizing uplink timing in a user equipment (UE), said apparatus comprising:

means for receiving a downlink synchronization shift (SS) command in a current sub-frame;

means for obtaining a preceding uplink timing from a preceding sub-frame associated with the downlink SS command;

means for adjusting a next uplink timing based on said preceding uplink timing and said downlink SS command of said current sub-frame; and means for transmitting a next sub-frame using said next uplink timing.

* * * * *